United States Patent
Uhl et al.

(10) Patent No.: US 12,384,873 B2
(45) Date of Patent: Aug. 12, 2025

(54) CATIONICALLY CURABLE COMPOSITION AND METHOD FOR THE JOINING, CASTING AND COATING OF SUBSTRATES USING THE COMPOSITION

(71) Applicant: DELO Industrie Klebstoffe GmbH & Co. KGaA, Windach (DE)

(72) Inventors: Gerald Uhl, Windach (DE); Timo Anselment, Windach (DE); Michael Scholz, Windach (DE); Sebastian Zink, Windach (DE); Kilian Kreul, Windach (DE)

(73) Assignee: DELO Industrie Klebstoffe GmbH & Co. KGaA, Windach (DE)

( * ) Notice: Subject to any disclaimer, the term of this patent is extended or adjusted under 35 U.S.C. 154(b) by 564 days.

(21) Appl. No.: 17/311,788

(22) PCT Filed: Nov. 28, 2019

(86) PCT No.: PCT/EP2019/082833
§ 371 (c)(1),
(2) Date: Jun. 8, 2021

(87) PCT Pub. No.: WO2020/120144
PCT Pub. Date: Jun. 18, 2020

(65) Prior Publication Data
US 2022/0064367 A1    Mar. 3, 2022

(30) Foreign Application Priority Data
Dec. 10, 2018    (DE) .................... 10 2018 131 513.9

(51) Int. Cl.
| | | |
|---|---|---|
| C08G 59/24 | (2006.01) |
| B29C 35/08 | (2006.01) |
| B32B 38/00 | (2006.01) |
| C08G 59/40 | (2006.01) |
| C08G 59/62 | (2006.01) |
| C09D 4/00 | (2006.01) |
| C09D 163/00 | (2006.01) |
| C09J 163/00 | (2006.01) |
| C09K 3/10 | (2006.01) |

(52) U.S. Cl.
CPC ......... C08G 59/24 (2013.01); C08G 59/4007 (2013.01); C08G 59/62 (2013.01); C09D 4/00 (2013.01); C09D 163/00 (2013.01); C09J 163/00 (2013.01); C09K 3/10 (2013.01); *B29C 2035/0833* (2013.01); *B32B 2038/0076* (2013.01); *C09K 2200/0647* (2013.01)

(58) Field of Classification Search
CPC .... C09K 3/10; C09K 2200/0647; C09D 4/00; C09D 163/00; C09D 171/00; C09D 129/10; C09J 163/00; C09J 171/00; C09J 129/10; C08G 59/24; C08G 59/4007; C08G 59/62; C08G 59/4064; C08G 59/4071; C08G 59/68; C08G 65/105; C08G 65/12; C08G 65/20; C08G 59/687; B29C 2035/0833; B32B 2038/0076; C08J 2363/00; C08J 2371/00; C08J 3/243; C08J 3/28; C08F 2/50; C08F 216/12; C08F 220/18; C08F 261/06; C08F 283/06; C08F 283/10
See application file for complete search history.

(56) References Cited

U.S. PATENT DOCUMENTS

| | | | |
|---|---|---|---|
| 4,849,320 A | 7/1989 | Irving et al. |
| 5,154,791 A | 10/1992 | Gasser et al. |
| 5,252,694 A | 10/1993 | Willett et al. |
| 5,707,780 A | 1/1998 | Lawton et al. |
| 5,922,784 A | 7/1999 | DeVoe et al. |
| 6,866,899 B2 | 3/2005 | Wright |
| 7,964,248 B2 | 6/2011 | Fong et al. |
| 8,542,451 B2 | 9/2013 | Lu et al. |

(Continued)

FOREIGN PATENT DOCUMENTS

| | | |
|---|---|---|
| CN | 105273167 A | 1/2016 |
| DE | 4340949 A1 | 6/1995 |

(Continued)

OTHER PUBLICATIONS

Wang et al., machine English translation of CN 105273167 (Year: 2016).*

(Continued)

*Primary Examiner* — Jessica M Roswell
(74) *Attorney, Agent, or Firm* — McNees Wallace & Nurick LLC (57) ABSTRACT

The invention relates to a cationically curable composition with at least one cationically polymerizable component, a first photoinitiator releasing an acid when irradiated with actinic radiation of a first wavelength $\lambda_1$, and a second photoinitiator releasing an acid when irradiated with actinic radiation of a second wavelength $\lambda_2$, wherein the second wavelength $\lambda_2$ is shorter than the first wavelength $\lambda_1$, and wherein the second photoinitiator, after irradiation of the composition with actinic radiation of the first wavelength $\lambda_1$, shows an absorption of actinic radiation of the second wavelength $\lambda_2$ in the composition that is sufficient to activate the second photoinitiator and fix the composition. Furthermore, a method is described for the joining, casting, molding, sealing and/or coating of substrates using the cationically curable composition.

28 Claims, 2 Drawing Sheets

(56) References Cited

U.S. PATENT DOCUMENTS

| | | | |
|---|---|---|---|
| 9,926,476 B2 | 3/2018 | Newcomb et al. | |
| 10,738,146 B2 | 8/2020 | Liska et al. | |
| 2003/0205317 A1* | 11/2003 | Ha | C09J 5/00 |
| | | | 428/615 |
| 2010/0239779 A1 | 9/2010 | Oshima | |
| 2012/0259031 A1* | 10/2012 | Dake | G03F 7/029 |
| | | | 522/27 |
| 2014/0238580 A1 | 8/2014 | Zhang et al. | |
| 2017/0198093 A1 | 7/2017 | Crivello | |
| 2017/0306198 A1 | 10/2017 | Newcomb et al. | |
| 2019/0309123 A1 | 10/2019 | Liska et al. | |

FOREIGN PATENT DOCUMENTS

| | | |
|---|---|---|
| EP | 0388775 A1 | 9/1990 |
| EP | 0764691 A2 | 3/1997 |
| EP | 0542716 B1 | 6/1997 |
| EP | 3184569 A1 | 6/2017 |
| EP | 3434708 A1 | 1/2019 |
| JP | S62273529 A | 11/1987 |
| JP | 2006117950 A | 5/2006 |
| JP | 2017171807 A | 9/2017 |
| JP | 2019518126 A | 6/2019 |
| WO | 2017035551 A1 | 3/2017 |
| WO | 2017178028 A1 | 10/2017 |
| WO | 2017184974 A1 | 10/2017 |
| WO | 2018102198 A1 | 6/2018 |

OTHER PUBLICATIONS

Chen et al. "A synergistic effect of a ferrocenium salt on the diaryliodonium salt-induced visible-light curing of bisphenol-A epoxy resin", Royal Science of Chemistry, RSC Advances, 2015, vol. 5, pp. 33171-33176.

Chen et al. "Synergy effect of Ferrocenium Salts on Diaryliodonium Salt Inducing Cationic Photopolymerizations", Beijing University of Chemical Technology, China.

Kostanski et al. "Cationic polymerization using mixed cationic photoinitiator systems", Designed Monomers and Polymer, Apr. 2012, 10:4, pp. 327-345.

* cited by examiner

CATIONICALLY CURABLE COMPOSITION AND METHOD FOR THE JOINING, CASTING AND COATING OF SUBSTRATES USING THE COMPOSITION

FIELD OF THE INVENTION

The invention relates to a cationically curable composition that can be activated by irradiation with actinic radiation, and a method for the joining, casting and coating of substrates using the composition.

TECHNICAL BACKGROUND

Cationically polymerizable compositions with photoinitiators based on sulfonium and iodonium salts have been part of the state of the art for years. An overview of suitable photoinitiators can be found in the publications of J. V. Crivello and K. Dietliker in "Photoinitiators for Free Radical, Cationic & Anionic Photopolymerisation", Vol. III of "Chemistry & Technology of UV & EB Formulation for Coatings, Inks & Paints", $2^{nd}$ ed., J. Wiley and Sons/SITA Technology (London), 1998.

$HSO_4^-$, $PF_6^-$, $SbF_6^-$, $AsF_6^-$, $Cl^-$, $Br^-$, $I^-$, $ClO_4^-$, $PO_4^-$, $SO_3CF_3^-$, tosylate or a borate anion such as $BF_4^-$ and $B(C_6F_5)_4^-$ can be used as anions for the sulfonium or iodonium salts. Aluminate anions as disclosed in EP 3 184 569 A1 or WO 2017 035 551 A1 are also suitable.

DE 43 40 949 A1 discloses cationically curable compositions that can be pre-activated by actinic radiation und cure within 24 hours at room temperature without further energy supply. A disadvantage of the known compositions is that, due to the addition of basic retardants, the buildup of strength takes place only slowly, and the handling strength after joining is often insufficient. Parts joined by means of these compositions thus require longer waiting periods or fixing aids until they can be further processed in subsequent steps.

A joining method using such compositions is known from EP 0 388 775 A1. In this method, a cationically polymerizable composition is activated by light of a wavelength from 400 to 600 nm for a period sufficient for the composition to be unrestrictedly applicable for more than 30 seconds after irradiation of the composition is completed.

CN 105 273 167 A describes the use of ferrocenium salts as sensitizers for the photopolymerization of cationically curable compositions with photoinitiators based on iodonium salts. The ferrocenium salts are used substoichiometrically and allow the initiation of the polymerization by the iodonium initiator under irradiation with visible light. However, a sequential irradiation at different wavelengths is not suggested.

In the scientific article by Kostanski et al., "Cationic polymerisation using mixed cationic photoinitiator systems" from *Designed Monomers and Polymers* 2007, Vol. 10, No. 4, Pages 327-345, mixtures of sulfonium or iodonium salts with ferrocenium salts are described. Here, the ferrocenium salts also serve as sensitizers for the photoinitiator based on the sulfonium or iodonium salt. A mercury high-pressure vapor lamp is used for irradiation. However, the various photoinitiators are not activated sequentially at specific wavelengths.

The scientific article by Chen et al., "A synergistic effect of a ferrocenium salt on the diaryliodonium salt-induced visible-light curing of bisphenol-A epoxy resin" from RSC Adv., 2015, 5, 33171, also describes a synergism between iodonium salts and ferrocenium salts. Again, the photoinitiator based on the iodonium salt is used in excess. The authors describe a higher turnover rate by addition of the ferrocenium salt. However, irradiation is performed using a halogen lamp with simultaneous activation of the iodonium salt and the ferrocenium salt.

U.S. Pat. No. 4,849,320 A describes a photolithographic method using a composition comprising two photoinitiators and a blend of radically and cationically polymerizable components. First, the composition is irradiated with a wavelength suitable for activating the radical photoinitiator to initially solidify the composition. Then, the solidified composition is irradiated with actinic radiation of a wavelength suitable for activating the cationic photoinitiator to generate structures in defined areas. In a subsequent washing process, the composition present outside of these areas that has been partially cured in the first step by radical polymerization only is removed. The photoinitiators are selected such that their absorption ranges do not overlap and can be selectively activated by different wavelengths.

U.S. Pat. No. 5,707,780 also describes compositions comprising blends of radically and cationically polymerizable components that can be simultaneously activated by irradiation with an argon laser at different wavelengths. The compositions are characterized by high initial strength after curing that can be achieved by setting the ratio of the extinction coefficients of the radical and cationic photoinitiators to each other. The described compositions can be used in additive manufacturing. A sequential exposure is not disclosed.

Compositions are known from U.S. Pat. No. 5,252,694 that contain, apart from radically and cationically polymerizable monomers, at least one catalyst system comprising an organometallic salt and a thermally decomposable ester. Optionally, the compositions also contain a photoinitiator for radical polymerization and peroxides as accelerators. The compositions are preferably used for coating applications. A sequential exposure of the compositions is not provided.

U.S. Pat. No. 6,866,899 describes the manufacture of adhesive compositions containing only radically curable constituents. The compositions are sequentially irradiated at different wavelengths. The first irradiation step is performed such that a wavelength is used that is always longer than the wavelength used in the second irradiation step. The photoinitiator contained in the compositions is selected such that it absorbs at each of the different wavelengths. The spectral overlap of the irradiation sources used should be as low as possible.

U.S. Pat. No. 7,964,248 discloses a photoinitiator system for cationic polymerization comprising at least two photoinitiators, with one of the photoinitiators being a sulfonium salt with a fluorophosphate anion. By combining two photoinitiators that are different from each other both the storage stability of the compositions and, at the same time, the mechanical properties of the cured composition are improved. A sequential irradiation of the composition at different wavelengths is not disclosed. In addition, the use of photoinitiators based on fluorophosphate anions does not allow for a sufficiently fast buildup of strength.

SUMMARY OF THE INVENTION

It is an object of the invention to avoid the disadvantages of the methods and compositions from the state of the art described above and to provide cationically curable compositions that can be diversely used in industrial joining and casting processes.

In particular, the cationically curable compositions are intended to allow for the provision of a method that can be used to specifically control the buildup of strength in the compositions.

According to the present invention, this object is achieved by a cationically curable composition according to Claim 1 and a method according to Claim 11.

Further embodiments of the invention are specified in the sub-claims that can be optionally combined with each other.

The cationically curable composition according to the present invention comprises:

a) at least one cationically polymerizable component;
b) a first photoinitiator releasing an acid when irradiated with actinic radiation of a first wavelength $\lambda_1$; and
c) a second photoinitiator releasing an acid when irradiated with actinic radiation of a second wavelength $\lambda_2$;

wherein the second wavelength $\lambda_2$ is shorter than the first wavelength $\lambda_1$, and the second photoinitiator, after irradiation of the composition with actinic radiation of the first wavelength $\lambda_1$, shows an absorption of actinic radiation of the second wavelength $\lambda_2$ in the composition that is sufficient to activate the second photoinitiator and fix the composition.

The cationically curable composition thus comprises cationically polymerizable components (A), a first photoinitiator (B1) and a second photoinitiator (B2) for cationic polymerization that is different from the first photoinitiator (B1). Apart from that, the composition can contain further additives (C), radically polymerizable constituents (D) and optionally another photoinitiator (E) for radical polymerization.

According to the present invention, the cationically curable composition is used in a method for the joining, casting or coating of substrates, with the method comprising the following steps:

a) providing the cationically curable composition described above;
b) dosing the composition onto a first substrate;
c) activating the composition by irradiation with actinic radiation of the first wavelength $\lambda_1$;
d) optionally supplying a second substrate to the activated composition on the first substrate, thus forming a substrate composite, and, furthermore, optionally aligning both substrates with each other;
e) fixing the activated composition by irradiation with actinic radiation of the second wavelength $\lambda_2$; and
f) optionally heating the fixed composition on the first substrate or in the substrate composite.

The method according to the present invention is characterized in that the second wavelength $\lambda_2$ is shorter than the first wavelength $\lambda_1$, and the second photoinitiator, after activation of the composition in step c), shows an absorption of actinic radiation of the second wavelength $\lambda_2$ in the composition that is sufficient to activate the second photoinitiator in step e).

In the method according to the present invention, the cationic polymerization of the composition can be initiated by the first irradiation step. However, after activation of the first photoinitiator by irradiation with actinic radiation of the first wavelength $\lambda_1$, the composition is still processable for a sufficiently long time. In particular, the substrates to be joined can be exactly aligned with each other within this period. This is of particular importance in joining processes for the manufacture of optoelectronic components such as camera modules. By the second irradiation step, the activated composition is transferred into a dimensionally stable state.

In addition, the method according to the present invention makes it possible to achieve reliable curing of the activated composition at room temperature without additional heat input. However, this does not exclude the possibility of accelerating curing by heating of the fixed composition.

In the sense of the method according to the present invention, "fixing" means the buildup of strength from which run-off of the composition can no longer take place, or the degree of strength from which the joined parts can be handled in subsequent processes without the adhesive bond being destroyed.

Another object of the invention is the use of the cationically curable composition according to the present invention in a method for the joining, casting, molding, sealing and coating of substrates in which the composition can be activated by irradiation with actinic radiation of a first wavelength $\lambda_1$ ranging from 400 to 600 nm, and fixed by subsequent irradiation with actinic radiation of a second wavelength $\lambda_2$ ranging from 200 to 400 nm, with the second wavelength $\lambda_2$ being shorter than the first wavelength $\lambda_1$.

DESCRIPTION OF THE DRAWINGS

In the enclosed drawings

DETAILED DESCRIPTION OF PREFERRED EMBODIMENTS

The invention is described in the following in detail and by way of example using preferred embodiments which, however, are not to be construed as limiting.

In the sense of the invention, "one-pack" or "one-pack composition" means that said components of the composition are jointly contained in a packaging unit.

In the sense of the invention, "liquid" means that the loss modulus G" determined by measuring the viscosity is larger than the storage modulus G' of the respective composition.

As far as the indefinite article "a" or "an" is used, this also comprises the plural form "one or more" unless explicitly excluded.

"At least bifunctional" means that, per molecule, two or more units of each functional group named are contained.

All weight proportions set out below relate to the total weight of the composition, if not stated otherwise.

Equivalents in the following refer in each case to 1 equivalent of the functional group, and are given in relation to each other.

To perform the method according to the present invention, in a first preferred embodiment the compositions contain cationically polymerizable components (A), at least two photoinitiators (B) for cationic polymerization that are different from each other, and, optionally, further additives (C). Preferably, the compositions of the first embodiment consist of said components (A), (B) and (C).

To perform the method according to the present invention, in a second preferred embodiment the compositions contain, apart from the abovementioned components (A), (B) and (C), additional radically polymerizable constituents (D) and, optionally, another photoinitiator (E) for radical polymerization. Preferably, the compositions of the second embodiment consist of said components (A) to (E).

The components of the cationically polymerizable composition for use in the method according to the present invention are described in detail in the following.

Component (A): Cationically Polymerizable Components

The cationically polymerizable components are not further restricted in terms of their chemical basis. Preferably, the cationically polymerizable components are selected from the group consisting of epoxy-containing compounds (A1), oxetane-containing compounds (A2), vinyl ethers (A3) and combinations thereof. Optionally, the cationically polymerizable component can additionally contain one or more alcohols (A4) as reactive flexibilizers. In a preferred embodiment, the composition contains at least one epoxy-containing compound (A1).

The epoxy-containing compound (A1) in the compositions according to the present invention preferably comprises one or more at least bifunctional epoxy-containing compounds. At least "bifunctional" means that the epoxy-containing compound contains at least two epoxy groups. Component (A1), for example, can comprise cycloaliphatic epoxides, aromatic and aliphatic glycidyl ethers, glycidyl esters or glycidyl amines and mixtures thereof.

Bifunctional cycloaliphatic epoxy resins are well known in the state of the art and contain compounds carrying both a cycloaliphatic group and at least two oxirane rings. Exemplary representatives are 3-cyclohexenylmethyl-3-cyclohexyl carboxylate diepoxide, 3,4-epoxycyclohexylalkyl-3', 4'-epoxy cyclohexane carboxylate, 3,4-epoxy-6-methylcyclohexylmethyl-3',4'-epoxy-6-methyl cyclohexane carboxylate, vinyl cyclohexene dioxide, bis(3,4-epoxycyclohexylmethyl) adipate, dicyclopentadiene dioxide and 1,2-epoxy-6-(2,3-epoxypropoxy)hexahydro-4,7-methane indane and mixtures thereof.

Aromatic epoxy resins can also be used in the compositions according to the present invention. Examples of aromatic epoxy resins are bisphenol-A epoxy resins, bisphenol-F epoxy resins, phenol novolac epoxy resins, cresol novolac epoxy resins, biphenyl epoxy resins, 4,4'-biphenyl epoxy resins, divinyl benzene dioxide, 2-glycidyl phenyl glycidyl ether, naphthalene diol diglycidyl ether, glycidyl ether of tris(hydroxyphenyl) methane and glycidyl ether of tris(hydroxyphenyl) ethane as well as mixtures thereof. In addition, all completely or partially hydrogenated analogues of aromatic epoxy resins can be used.

Isocyanurates and other heterocyclic compounds substituted with epoxy-containing groups can also be used in the compositions according to the present invention. Examples are triglycidyl isocyanurate and monoallyl diglycidyl isocyanurate.

Moreover, polyfunctional epoxy resins of all resin groups mentioned, viscoplastic epoxy resins and blends of different epoxy resins can be used in the compositions according to the present invention.

A combination of several epoxy-containing compounds, at least one of which is bifunctional or of a higher functionality, is also in the sense of the invention.

In addition to the at least bifunctional epoxy-containing compounds, monofunctional epoxides can also be used as reactive diluents.

Examples of commercially available epoxy-containing compounds are products available under the trade names CELLOXIDE™ 2021P, CELLOXIDE™ 8000 by Daicel Corporation, Japan, EPIKOTE™ RESIN 828 LVEL, EPIKOTE™ RESIN 166, EPIKOTE™ RESIN 169 by Momentive Specialty Chemicals B.V., Netherlands, Epilox™ resins from the product series A, T and AF by Leuna Harze, Germany, or EPICLON™ 840, 840-S, 850, 850-S, EXA850CRP, 850-LC by DIC K.K., Japan, Omnilane 1005 and Omnilane 2005 by IGM Resins B.V., Syna Epoxy 21 and Syna Epoxy 06 by Synasia Inc., TTA21, TTA26, TTA60 and TTA128 by Jiangsu Tetra New Material Technology Co. Ltd.

Instead of or in addition to the epoxy-containing compound (A1), oxetane-containing compounds (A2) can be used as cationically curable components (A) in the compositions. Methods for the manufacture of oxetanes are particularly known from US 2017/0198093 A1.

Examples of commercially available oxetanes are bis(1-ethyl-3-oxetanyl-methyl) ether (DOX), 3-allyloxymethyl-3-ethyl oxetane (AQX), 3-ethyl-3-[(phenoxy)methyl]oxetanes (POX), 3-ethyl-3-hydroxymethyl oxetanes (OXA), 1,4-bis[(3-ethyl-3-oxetanylmethoxy)methyl]benzene (XDO), 3-ethyl-3-[(2-ethylhexyloxy)methyl]oxetane (EHOX). Said oxetanes are commercially available by TOAGOSEI CO., LTD.

Instead of or in addition to components (A1) and (A2), vinyl ethers (A3) can be used as cationically curable components in the compositions. Suitable vinyl ethers are trimethylol propane trivinyl ethers, ethylene glycol divinyl ethers and cyclic vinyl ethers as well as mixtures thereof. Moreover, vinyl ethers of polyfunctional alcohols can be used.

Finally, the cationically polymerizable component can optionally also comprise one or more alcohols (A4) that are used as reactive flexibilizers. In particular polyols of a higher molecular weight can be used to flexibilize cationic compositions. For example, suitable polyols are available based on polyethers, polyesters, polycaprolactones, polycarbonates or (hydrogenated) polybutadiene diols.

Examples of commercially available polyols of a higher molecular weight are products available under trade names ETERNACOLL UM-90 (1/1), Eternacoll UHC50-200 by UBE Industries Ltd., Capa™ 2200, Capa™ 3091 by Perstorp, Liquiflex H by Petroflex, Merginol 901 by HOBUM Oleochemicals, Placcel 305, Placcel CD 205 PL by Daicel Corporation, Priplast 3172, Priplast 3196 by Croda, Kuraray Polyol F-3010, Kuraray Polyol P-6010 by Kuraray Co., Ltd., Krasol LBH-2000, Krasol HLBH-P3000 by Cray Valley or Hoopol S-1015-35 or Hoopol S-1063-35 by Synthesia Internacional SLU.

The above list of cationically polymerizable components (A) is to be considered as exemplary rather than final. A mixture of said cationically polymerizable components (A1) to (A4) is also in the sense of the invention.

In the composition according to the present invention, the cationically polymerizable component (A) is preferably present in a proportion of 5 to 99 wt-%, particularly preferably in a proportion of 10 so 95 wt-%, based on the total weight of the composition.

According to a preferred embodiment, the cationically polymerizable component (A) consists of the epoxy-containing component (A1) and, optionally, at least one alcohol (A4) as a reactive flexibilizer.

In another embodiment, the epoxy-containing compound can be completely or partially replaced by an oxetane-containing compound.

Furthermore, in addition to the epoxy-containing component (A1) and/or the oxetane-containing compound (A2), the cationically polymerizable component can contain one or more vinyl ethers. In this case, the vinyl ether is present in a proportion of 0 to 20 wt-%, preferably in a proportion of 0 to 15 wt-%, each based on the total weight of the composition.

In the compositions for use in the method according to the present invention, component (A4) is present in a proportion of 0 to 80 wt-%, preferably in a proportion of 0 to 60 wt-%, particularly preferably in a proportion of 1 to 50 wt-%, each based on the total weight of the composition.

Component (B): Photoinitiators for Cationic Polymerization

Apart from component (A), the compositions for use in the method according to the present invention contain at least two photoinitiators (B1) and (B2) for cationic polymerization selected from the group of photolatent acid generators. This means that, when irradiated with actinic radiation of a predetermined wavelength, the photoinitiators (B1) and (B2) are activated and release an acid. The acid can be a Lewis acid or a Brönsted acid. The photoinitiators (B1) and (B2) differ from each other and can be activated by irradiation at different wavelengths.

Monochromatic laser light can be used to irradiate the photoinitiators (B1) and (B2). However, the use of radiation sources having a singular emission maximum at the predetermined wavelength is preferred. The radiation source is preferably a commercially available LED curing lamp.

Component (B1): Metallocenium-Based Photoinitiator

The compositions according to the present invention preferably contain at least one photolatent acid generator based on a metallocenium compound as a photoinitiator (B1) for cationic polymerization. An overview of various metallocenium salts is disclosed in EP 0 542 716 B1. Examples of different anions of the metallocenium salts are $HSO_4^-$, $PF_6^-$, $SbF_6^-$, $AsF_6^-$, $Cl^-$, $Br^-$, $I^-$, $ClO_4^-$, $PO_4^-$, $SO_3CF_3^-$, tosylate, aluminates or a borate anion such as $BF_4$ and $B(C_6F_5)_4^-$.

Preferably, the photoinitiator based on a metallocenium compound is selected from the group of ferrocenium salts.

Examples of suitable ferrocenium salts are cumenylcyclopentadienyl iron (II) hexafluorophosphate (Irgacure 261); naphthalenylcyclopentadienyl iron (II) hexafluorophosphate, benzylcyclopentadienyl iron (II) hexafluorophosphate and cyclopentadienyl carbazole iron (II) hexafluorophosphate.

The photoinitiator (B1) preferably absorbs in the visible range of the electromagnetic spectrum. This means that the photoinitiator (B1) can be preferably activated at a first wavelength A, ≥380 nm. Preferably, the photoinitiator (B1) can be activated by radiation of a wavelength of ≥400 nm, preferably ≥460 nm. Particularly preferably, the activation wavelength $\lambda_1$ is in the range of 400 to 750 nm.

Based on the total weight of the composition, the photoinitiator (B1) is contained in a proportion of 0.01 to 5 wt-%, but preferably in proportions of 0.3 to 3 wt-%.

(B2): Photoinitiator Based on Onium Compounds

Apart from the metallocenium-based photolatent acid generator (B1), the compositions for performing the method according to the present invention contain at least one second photolatent acid generator based on an onium compound as a photoinitiator (B2) for cationic polymerization. Onium compounds from the group of aryl sulfonium salts and aryl iodonium salts as well as combinations thereof are preferred.

Aromatic aryl sulfonium salts suitable as photolatent acids (B2) are described, for example, in WO 2003/072567 or WO 2003/008404. Suitable aryl iodonium salts are disclosed in WO 1998/002493 or U.S. Pat. No. 6,306,555.

In addition, onium salts suitable as photolatent acids (B2) are described by J. V. Crivello and K. Dietliker in "Photoinitiators for Free Radical, Cationic & Anionic Photopolymerisation", Vol. III of "Chemistry & Technology of UV & EB Formulation for Coatings, Inks & Paints", $2^{nd}$ ed., J. Wiley and Sons/SITA Technology (London), 1998.

For example, $HSO_4^-$, $PF_6^-$, $SbF_6^-$, $AsF_6^-$, $Cl^-$, $Br^-$, $I^-$, $ClO_4^-$, $PO_4^-$, $SO_3CF_3^-$, tosylate, aluminates or a borate anion such as $BF_4$ and $B(C_6F_5)_4^-$ can serve as anions of the sulfonium or iodonium salts. For higher polymerization rates, barely nucleophilic complex anions are preferred. Particularly preferably, aryl sulfonium and aryl iodonium salts are used as the photoinitiator (B2), particularly with hexafluoroantimonate as a counter ion.

Photolatent acids based on onium salts with aluminate anions as disclosed in EP 3 184 569 A1 or WO 2017 035 551 A1 are also suitable.

Photoinitiators based on triaryl sulfonium commercially available as photolatent acids are available under the trade names Chivacure 1176, Chivacure 1190 by Chitech, Irgacure 290, Irgacure 270, Irgacure GSID 26-1 by BASF, Speedcure 976 and Speedcure 992 by Lambson, TTA UV-692, TTA UV-694 by Jiangsu Tetra New Material Technology Co., Ltd. or UVI-6976 and UVI-6974 by Dow Chemical Co.

Photoinitiators based on diaryl iodonium commercially available as photolatent acids are, for example, available under the brand names UV1242 or UV2257 by Deuteron and Bluesil 2074 by Bluestar.

The photoinitiator (B2) used in the compositions according to the present invention can preferably be activated by irradiation with actinic radiation of a wavelength $\lambda_2$ of 200 to 400 nm, particularly preferably of a wavelength $\lambda_2$ of 250 to 365 nm. If necessary, the photoinitiator (B2) can be combined with a suitable sensitizer.

The above lists are to be considered as exemplary for the photoinitiator (B) and in no way as limiting.

Based on the total weight of the composition, the photoinitiator (B2) is contained in a proportion of 0.01 to 5 wt-%, but preferably in proportions of 0.3 to 3 wt-%.

Based on the total weight of the composition, the proportion of both photoinitiators (B1) and (B2) is from 0.02 to 10 wt-%, preferably from 0.6 to 6 wt-%.

The difference between the first wavelength $\lambda_1$ used to irradiate and activate the first photoinitiator (B1) and the wavelength $\lambda_2$ used to irradiate and activate the second photoinitiator (B2) is preferably at least 20 nm, preferably at least 50 nm. The same applies to the emission maxima of the radiation sources used for irradiation. Preferably, the difference between wavelengths $\lambda_1$ and $\lambda_2$ is selected in such a way that there is no overlap between the emission spectra of the radiation sources.

Component (C): Additives

In addition, the described compositions can contain optional constituents as additives (C). The additives (C) are preferably selected from the group of fillers, colorants, pigments, anti-ageing agents, fluorescent agents, stabilizers, accelerators, adhesion promoters, drying agents, crosslinking agents, flow improvers, wetting agents, thixotropic agents, diluents, non-reactive flexibilizers, non-reactive polymeric thickeners, flame retardants, corrosion inhibitors, plasticizers and tackifiers.

Some of the additives usable as component (C) are described in detail in the following.

Sensitizer (C1):

Optionally, the compositions for performing the method according to the present invention can contain suitable sensitizers. In particular, the sensitizer (C1) can be used to allow for the activation of the photoinitiator (B2) at the wavelength $\lambda_2$. Thus, the sensitizer (C1) has to be selected in such a way that irradiation with the wavelength $\lambda_1$ does not already activate the photoinitiator (B2).

Examples of suitable sensitizers (C1) are anthracene, perylene, phenothiazine, xanthone, thioxanthone, benzophenone, ethyl-4-dimethylaminobenzoate or sterically hindered amines.

In particular, thioxanthone derivatives such as 2,4-diethyl thioxanthone (DETX), 1-chloro-4-propoxy thioxanthone (CPTX) and isopropyl thioxanthone (ITX) commercially available by Lambson can be used. Anthracene derivatives such as 2-ethyl-9,10-dimethoxy anthracene (EDMA), 9-hydroxymethyl anthracene (HMA), 9,10-dibutoxy anthracene, available by Sigma-Aldrich, can also be used.

The above list is to be considered as exemplary rather than final.

In the composition, the sensitizer (C1) is preferably contained in a proportion of 0 to 5 wt-%, more preferably in proportions of 0 to 3 wt-%, and particularly preferably in a proportion of 0 to 1 wt-%, each based on the total weight of the composition.

Accelerator (C2):

As accelerators for curing of the composition by cationic polymerization, in particular peroxy compounds of the perester, diacyl peroxide and peroxy dicarbonate type and/or hydroperoxides can be used. The use of hydroperoxides is preferred. As a particularly preferred accelerator, cumolhydroperoxide is used in the form of an approximately 70-90% solution in cumol.

By using peroxides, skin formation in the compositions following irradiation and activation of the first photoinitiator (B1) with the first wavelength $\lambda_1$ is accelerated. The proportion of peroxides is selected in such a way that in the method according to the present invention a sufficient open time for joining and optionally aligning a second substrate is left. The duration of the open time required depends on the respective processing procedure performed.

Based on the total weight of the composition, the peroxide (C2) is preferably contained in a proportion of 0 to 5 wt-%.

The mass ratio between the first photoinitiator (B1), for example ferrocenium hexafluoroantimonate, and the peroxide (C2), for example cumol hydroperoxide, can be varied within wide limits. Preferably, a ratio from 1:0.1 to 1:6, and particularly preferably from 1:2 to 1:4 is used.

Component (D): Radically Polymerizable Compounds

Optionally, the compositions for use in the method according to the present invention contain, apart from components (A) to (C), further radically polymerizable compounds. The radically polymerizable compounds are preferably radiation-curable compounds. The use of radiation-curable compounds based on (meth)acrylates is particularly preferred. They are not further restricted in terms of their chemical structure. For example, both aliphatic and aromatic (meth)acrylates can be used. Here and in the following both the derivatives of acrylic acid and those of methacrylic acid as well as combinations and mixtures thereof are referred to as (meth)acrylates.

The radically polymerizable compounds (D) can be used to increase the light fixing strength achieved by irradiation of the compositions with the second wavelength $\lambda_2$.

Preferably, the radiation-curable compound is at least bifunctional. For example, the following radiation-curable compounds are suitable: isobornyl acrylate, stearyl acrylate, tetrahydrofurfuryl acrylate, cyclohexyl acrylate, 3,3,5-trimethylcyclohexanol acrylate, behenyl acrylate, 2-methoxyethyl acrylate and other mono- or polyalkoxylated alkyl acrylates, isobutyl acrylate, isooctyl acrylate, lauryl acrylate, tridecyl acrylate, isostearyl acrylate, 2-(o-phenylphenoxy) ethyl acrylate, acryloyl morpholine, N,N-dimethyl acryl amide, 4-butane diol diacrylate, 1,6-hexane diol diacrylate, 1,10-decane diol diacrylate, tricyclodecane dimethanol diacrylate, dipropylene glycol diacrylate, tripropylene glycol diacrylate, polybutadiene diacrylate, cyclohexane dimethanol diacrylate, diurethane acrylates of monomeric, oligomeric or polymeric diols and polyols, trimethylol propane triacrylate (TMPTA) and dipentaerythritol hexaacrylate (DPHA) as well as combinations thereof. Acrylates of a higher functionality derived from multi-branched or dendrimeric alcohols can be used advantageously.

The analogous methacrylates are also in the sense of the invention.

Furthermore, radiation-curable compounds with allyl groups, such as 1,3,5-triazine-2,4,6(1H,3H,5H) trione, which is commercially available as TAICROS®, are also suitable. Unhydrogenated polybutadienes with free double bonds, such as the poly BD® types, can also be used as radiation-curable compound (C).

Urethane acrylates based on polyesters, polyethers, polycarbonate diols and/or (hydrogenated) polybutadiene diols can be used as a radiation-curable compound of a higher molecular weight for component (C).

Preferably, radiation-curable compounds having both radically polymerizable groups and cationically curable epoxy groups are used.

Examples of commercially available products having both radically polymerizable groups and cationically curable epoxy groups comprise 3,4-epoxycyclohexylmethyl methacrylate (TTA15) by Jiangsu Tetra New Material Technology Co., Ltd., UVACURE 1561 by UCB, Solmer SE 1605 by Melrob Ltd. and Mirame PE210HA by Miwon Europe GmbH.

A combination of several radiation-curable compounds is also in the sense of the invention.

In the composition according to the present invention, the radically polymerizable compound is preferably present in a proportion of up to 50 wt-%, particularly preferably in a proportion of 5 to 50 wt-%, each based on the total weight of the composition.

Component (E): Photoinitiator for Radical Polymerization

Apart from components (A) to (D), the compositions for use in the method according to the present invention optionally contain a photoinitiator (E) for activating radical polymerization. As photoinitiators, the common commercially available compounds can be used, such as $\alpha$-hydroxy ketones, benzophenone, $\alpha,\alpha'$-diethoxy acetophenone, 4,4-diethylamino benzophenone, 2,2-dimethoxy-2-phenyl acetophenone, 4-isopropylphenyl-2-hydroxy-2-propyl ketone, 1-hydroxycyclohexylphenyl ketone, isoamyl-p-dimethyl aminobenzoate, methyl-4-dimethyl aminobenzoate, methyl-o-benzoyl benzoate, benzoine, benzoine ethyl ether, benzoine isopropyl ether, benzoine isobutyl ether, 2-hydroxy-2-methyl-1-phenyl-propane-1-one, 2-isopropyl thioxanthone, dibenzosuberone, 2,4,6-trimethylbenzoyl diphenyl phosphine oxide and bisacylphosphine oxides, with said photoinitiators being able to be used alone or in combination of two or more of said compounds.

For example, the IRGACURE™ types by BASF SE can be used as UV photoinitiators, for example the IRGACURE 184, IRGACURE 500, IRGACURE 1179, IRGACURE 2959, IRGACURE 745, IRGACURE 651, IRGACURE 369, IRGACURE 907, IRGACURE 1300, IRGACURE 819, IRGACURE 819DW, IRGACURE 2022, IRGACURE 2100, IRGACURE 784, IRGACURE 250, IRGACURE TPO, IRGACURE TPO-L types. In addition, the DARO- CUR™ types by BASF SE can be used, for example the DAROCUR MBF, DAROCUR 1173, DAROCUR TPO and DAROCUR 4265 types.

The photoinitiator used in the compositions according to the present invention as component (E) can be preferably activated by actinic radiation of a wavelength from 200 to 400 nm, particularly preferably from 250 to 365 nm. The radical photoinitiator (E) is preferably selected in such a way that it is not yet activated when the composition is irradiated with the first wavelength $\lambda_1$. Particularly preferably, in the method according to the present invention, the photoinitiator (E) is activated together with a second photoinitiator (B2) by irradiating the composition at the second wavelength $\lambda_2$.

In the composition according to the present invention, the photoinitiator (E) is preferably present in a proportion of 0.01 to 5 wt-%, based on the total weight of the composition.

Formulation of the Cationically Polymerizable Compositions

A formulation of the compositions for use in the method according to the present invention comprises at least the components (A), (B1) and (B2) described above.

Preferably, the composition consists of the following components, each based on the total weight of the composition:
a) at least one cationically polymerizable component (A) in a proportion of 5 to 99.98 wt-%, wherein the cationically polymerizable compound (A) is preferably selected from the group consisting of epoxy-containing compounds (A1), oxetane-containing compounds (A2), vinyl ethers (A3) and combinations thereof, optionally together with an alcohol as a reactive flexibilizer (A4) in a proportion of 0 to 80 wt-%;
b) the first photoinitiator (B1) in a proportion of 0.01 to 5 wt-%, preferably a ferrocenium salt;
c) the second photoinitiator (B2) in a proportion of 0.01 to 5 wt-%, preferably an aryl sulfonium salt, an aryl iodonium salt and combinations thereof;
d) a sensitizer (C1) for the second photoinitiator (B2) in a proportion of 0 to 5 wt-%;
e) a peroxide as an accelerator (C2) for curing of the composition in a proportion of 0 to 5 wt-%;
f) at least one radically polymerizable compound (D) in a proportion of 0 to 50 wt-%, preferably 5 to 50 wt-%, more preferably based on a (meth)acrylate;
g) a radical photoinitiator (E) in a proportion of 0 to 5 wt-%, preferably of 0.01 to 5 wt-%; and
h) further additives (C) in a proportion of 0 to 70 wt-%, preferably further additives from the group of fillers, colorants, pigments, anti-ageing agents, fluorescent agents, stabilizers, accelerators, adhesion promoters, drying agents, crosslinking agents, flow improvers, wetting agents, thixotropic agents, diluents, non-reactive flexibilizers, non-reactive polymeric thickeners, flame retardants, corrosion inhibitors, plasticizers and tackifiers.

The cationically polymerizable component (A) preferably consists of the epoxy-containing component (A1) and optionally at least one alcohol (A4) as the reactive flexibilizer. As an alternative, the epoxy-containing compound (A1) can be completely or partially replaced by an oxetane-containing compound (A2).

According to a first embodiment, the composition preferably comprises or consists of the following components, each based on the total weight of the composition:
0-99.8 wt-%, preferably 5 to 99 wt-% of the epoxy-containing compound (A1);
0-99.8 wt-% of the oxetane-containing compound (A2);
0-80 wt-% of the polyol-based reactive flexibilizer (A4);
0.01-5 wt-% of the first photoinitiator (B1) for cationic polymerization based on a ferrocenium salt;
0.01-5 wt-% of the second photoinitiator (B2) for cationic polymerization based on a sulfonium or iodonium salt;
0-5 wt-% of a sensitizer (C1); and
0-70 wt-% of a further additive (C), wherein the epoxy-containing compound (A1) and the oxetane-containing compound (A2), alone or together, are present in the composition in a proportion of at least 5 wt-%.

In a second embodiment, the composition preferably comprises or consists of the following components, each based on the total weight of the composition:
0-95 wt-%, preferably 5 to 95 wt-% of the epoxy-containing compound (A1);
0-95 wt-% of the oxetane-containing compound (A2);
0-80 wt-% of the polyol-based reactive flexibilizer (A4);
0.01-5 wt-% of the first photoinitiator (B1) for cationic polymerization based on a ferrocenium salt;
0.01-5 wt-% of the second photoinitiator (B2) based on a sulfonium or iodonium salt;
0-5 wt-% of a sensitizer (C1);
5-50 wt-% of at least one radically polymerizable compound (D) from the group of (meth)acrylates;
0.01-5 wt-% of a photoinitiator (E) for radical polymerization; and
0-70 wt-% of a further additive (C),
wherein the epoxy-containing compound (A1) and the oxetane-containing compound (A2), alone or together, are present in the composition in a proportion of at least 5 wt-%.

The cationically polymerizable compositions according to the present invention are preferably provided as one-pack compositions.

Selection Rules for Photoinitiators (B1) and (B2)

According to the present invention, the cationically polymerizable compositions described above are used in a method in which the composition is first activated by irradiation with actinic radiation of a first wavelength $\lambda_1$ ranging from 400 to 600 nm and then fixed by subsequent irradiation with actinic radiation of a second wavelength $\lambda_2$ ranging from 200 to 400 nm, with the second wavelength $\lambda_2$ being shorter than the first wavelength $\lambda_1$. In addition, it is required that the second photoinitiator (B2), after activation of the composition by irradiation with actinic radiation of a first wavelength $\lambda_1$, shows an absorption of actinic radiation of the second wavelength $\lambda_2$ in the composition that is sufficient to activate the second photoinitiator (B2) in the subsequent irradiation step.

The photoinitiators (B1) and (B2) that are used to formulate the cationically polymerizable compositions used in the method according to the present invention can be selected according to the rules described below.

It is essential when selecting the first and second photoinitiators for cationic polymerization that initially the first photoinitiator (B1) can be activated at the first wavelength $\lambda_1$ without simultaneous activation of the second photoinitiator (B2) contained in the composition. In addition, the first photoinitiator (B1) is selected such that the decomposition products formed in the composition, after activation of the photoinitiator (B1) by irradiation with the wavelength $\lambda_1$, allow for a preferably unrestricted activation of the second photoinitiator (B2) in the composition by irradiation at the wavelength $\lambda_2$.

This can be set by photoinitiator selection, use of suitable sensitizers and the concentration ratio of the photoinitiators (B1) and (B2) to one another. In addition, absorption by the other components (A), (C), (D) and (E) of the composition plays a role with respect to the absorption behavior of the second photoinitiator (B2) at the second wavelength $\lambda_2$.

For selecting suitable photoinitiators (B), UV/VIS spectra of the photoinitiators (B1), (B2) and the optionally used sensitizers (C1) in a suitable solvent can be recorded. First, the absorption behavior of the blend of photoinitiators (B1) and (B2) prior to introducing actinic radiation is studied by recording an UV/VIS spectrum. In the sense of the invention, the photoinitiator (B1) is considered as sufficiently activatable if, by absorption of actinic radiation at the predetermined wavelength $\lambda_1$, a cationic polymerization is initiated without the second photoinitiator (B2) being activated simultaneously (B2). The wavelength $\lambda_1$ preferably corresponds to the excitation maximum of the photoinitiator (B1) and is outside an excitation range of the photoinitiator (B2).

Subsequently, the absorption behavior of the blend of photoinitiators (B1) and (B2) after irradiation with actinic radiation of the wavelength $\lambda_1$ is again studied by measuring an UV/VIS spectrum to evaluate the photoinitiator (B2) with regard to its suitability to be activated by irradiation at the wavelength $\lambda_2$. In the sense of the invention, the photoinitiator (B2) is considered as sufficiently activatable if, by absorption of actinic radiation at the predetermined wavelength $\lambda_2$, the photoinitiator (B2) is activated and a skin forms in the composition. To this end, the absorption band of the photoinitiator (B2) at the wavelength $\lambda_2$ has to be above the absorption of (B1) and the decomposition products (B1') formed after the activation of the photoinitiator (B1). The wavelength $\lambda_2$ preferably corresponds to the excitation maximum of the second photoinitiator (B2).

When the absorption of the photoinitiators (B1) and (B2) is restricted due to components contained in the composition, such as fillers, pigments or the resin components used at the wavelengths $\lambda_1$ and $\lambda_2$, the photoinitiators (B1) and (B2) can be selected by recording and evaluating UV/VIS spectra of the formulated composition containing components (A), (C) and optionally (D) and (E) using an analogous procedure.

Use of the Method According to the Present Invention

The method according to the present invention is suitable for the joining, casting, molding, sealing and coating of substrates. In particular for manufacturing processes in which a quick initial strength and, at the same time, a reliable final curing, preferably without additional heat input, is required, the method according to the present invention can be used advantageously.

The method according to the present invention comprises the following steps:
a) providing a cationically curable composition according to the above description;
b) dosing the composition onto a first substrate;
c) activating the composition by irradiation with actinic radiation of the first wavelength $\lambda_1$;
d) optionally supplying a second substrate to the activated composition on the first substrate, thus forming a substrate composite, and, furthermore, optionally aligning both substrates with one another;
e) fixing the activated composition by irradiation with actinic radiation of the second wavelength $\lambda_2$; and
f) optionally heating the fixed composition on the first substrate or in the substrate composite.

The method is characterized in that the second wavelength $\lambda_2$ is shorter than the first wavelength $\lambda_1$, and the second photoinitiator, after activation of the composition in step c), shows an absorption of actinic radiation of the second wavelength $\lambda_2$ in the composition that is sufficient to activate the second photoinitiator in step e).

For activation, the composition is preferably irradiated with actinic radiation of a wavelength $\lambda_1$ ranging from 400 to 600 nm, preferably a wavelength of 460±20 nm.

In step e), the composition is preferably irradiated with actinic radiation of a wavelength $\lambda_2$ ranging from 200 to 400 nm, preferably at 365±20 nm.

Irradiation is preferably performed with a radiation source having a radiation spectrum with a singular emission peak at the wavelength $\lambda_1$. Halogen lamps or any kind of broad band radiator are not preferred for the purposes of the invention. Unlike irradiation with lamps emitting a continuous radiation spectrum or having several emission maxima distributed over a wavelength band, the use of radiation sources with a singular emission peak allows for the targeted excitation of the photoinitiators (B1) and (B2) contained in the cationic composition. Preferably, the radiation source is an LED irradiation lamp.

When using a so-called flow device, the activation step c) can be performed prior to the dosing step b). Suitable dosing devices for flow activation of the compositions by irradiation are described in DE 3 702 999 and DE 10 2007 017 842.

Both the supply of a second substrate in step d) and irradiation with the second wavelength $\lambda_2$ in step e) are performed within the open time of the activated composition as otherwise an unrestricted run-off of the composition to the second substrate and/or an unrestricted activation of the second photoinitiator (B2) can no longer be guaranteed.

Preferred applications of the method according to the present invention comprise in particular the casting of switches, plugs and/or relays.

The use of the method according to the present invention is also preferred in the manufacture of optoelectronic assemblies such as camera modules. The method can be used in particular for so-called active alignment processes as described in U.S. Pat. No. 8,542,451. An advantage over the state of the art is that the compositions can be activated by irradiation with the first wavelength $\lambda_1$ and unrestrictedly contacted with a second substrate within the open time. For example, components such as the lens barrel can be aligned in relation to the image sensor or a corresponding holding device after the composition was dosed and already activated by irradiation at the first wavelength $\lambda_1$. The optoelectronic assemblies are typically aligned in various planes with the sensor switched on, evaluating optical measurement signals and adapting the position of the lens barrel or, alternatively, the position of the sensor with the aid of a micromanipulator or robot devices. As soon as a sufficiently high quality of the measurement signals is achieved, the corresponding position can be fixed by irradiation with actinic radiation of the wavelength $\lambda_1$ and activation of the photoinitiator (B2). Immediately after irradiation at the wavelength $\lambda_1$, the camera setup has sufficient handling strength and can be passed on to further process steps. Final curing occurs at room temperature within at most 7 days without additional heat input. This is particularly advantageous as no expensive and energy-intensive heating devices are required.

Apart from high light fixing strengths after the second irradiation step, the compositions used for the method according to the present invention are further characterized by high reliability and stability after complete curing as known from cationic compositions.

Curing of the Compositions According to the Present Invention

Directly after activation of the second photoinitiator, the compositions according to the present invention achieve a handling strength ("green strength") at room temperature that is sufficient for further processing of the manufactured parts. In particular in joining processes, a sufficient handling strength is considered as being achieved if preferably a shear strength of 1 MPa is reached.

Final curing occurs at room temperature within at most 7 days, preferably within 5 days and particularly preferably within 3 days. The curing reaction can be accelerated by heating.

At a temperature of 60° C., the compositions can be completely cured within 4 h, preferably within 2 h. At a temperature of 80° C., curing can be typically completed within 2 h, preferably within 1 h.

Temperature-graded curing profiles are also in the sense of the invention.

Heat, for example, can be introduced by means of convection furnaces, thermodes, IR radiators, laser or induction.

Measuring Methods Used and Definitions

Irradiation

Figure 1:
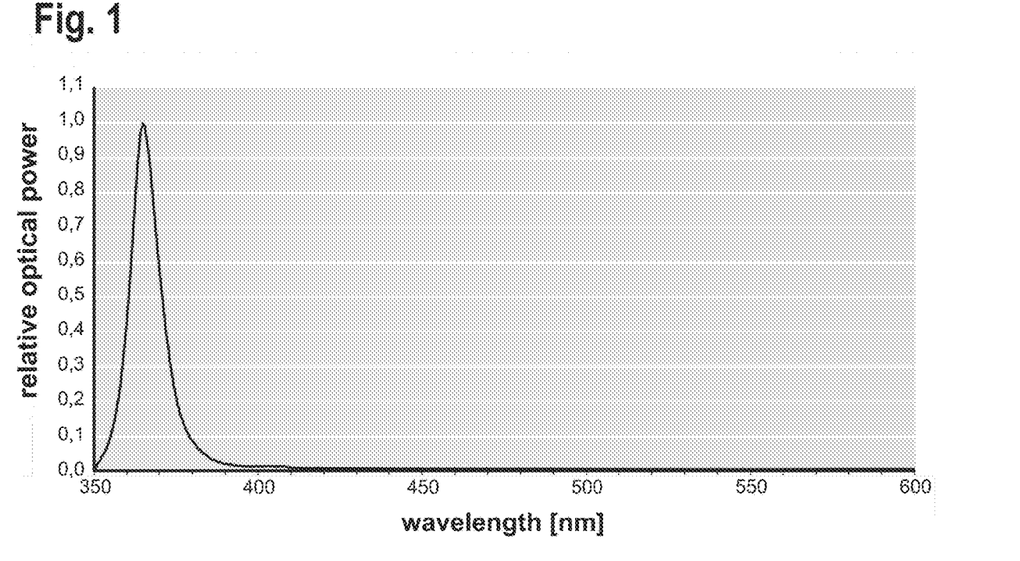
FIG. 1 shows an emission spectrum of a DELOLUX 20/365 LED irradiation lamp.

For activation of the photoinitiator (B1), the masses according to the present invention were irradiated using a DELOLUX 20/460 LED lamp from DELO Industrie Klebstoffe GmbH & Co. KGaA with an emission maximum at 460 nm and an intensity of 200±20 mW/cm$^2$ for a period of 30 s. For subsequent activation of the photoinitiator (B2) and, optionally, the radical photoinitiator (E), the compositions according to the present invention were irradiated with a DELOLUX 20/365 LED lamp from DELO Industrie Klebstoffe GmbH & Co. KGaA with an emission maximum at 365 nm and an intensity of 200±20 mW/cm$^2$ for a period of 30 s. The emission spectrum of the DELOLUX 20/365 LED lamp is shown as an example in FIG. 1.

Curing

"Crosslinking" or "curing" is defined as a polymerization or addition reaction beyond the gel point. The gel point is the point at which the storage modulus G' becomes equal to the loss modulus G". Curing of the specimens takes place at room temperature for 7 days.

Room Temperature

Room temperature is defined as 23±2° C.

Assessment of Light-Fixation

To assess the light-fixation (solid vs. liquid), the compositions are subjected to an optical assessment. Optionally, a haptic test is performed using a plastic spatula.

Open Time

Open time is the period between the activation of the composition by irradiation and the point when a skin begins to form. Skin formation is tested by touching an activated drop of adhesive with a spatula. A skin is regarded as formed when there is no stringing. The open time of the compositions described particularly depends on the temperature and irradiation dose.

UV/VIS Transmission

Transmission of the compositions was determined with an UV/VIS spectrometer of the SPECORD 50 PLUS type, available from Analytik Jena. The measurements were performed in accordance with DIN 5036-3.

Manufacture of Curable Compositions

To manufacture the cationically curable compositions used in the following examples, the liquid constituents are mixed, and then fillers and, optionally, further solids are incorporated by means of a laboratory agitator, a laboratory dissolver or a speed mixer (Hauschild) until a homogeneous composition is formed. Accordingly, compositions containing photoinitiators and being sensitive towards visible light have to be manufactured using light outside the excitation wavelength of the photoinitiators or sensitizers.

All compounds used for the manufacture of the curable compositions and their abbreviations are listed below:

Component (A): Cationically Polymerizable Constituents (A1) Epoxy-Containing Compounds
 (a1-1): 3,4-epoxycyclohexylmethyl-3',4'-epoxy cyclohexane carboxylate, available under the trade name Celloxide 2021 P by Daicel (A2) Oxetane-Containing Compounds:
 (a2-1): OXT-221=bis[1-ethyl(3-oxetanyl)]methyl ether; available by Toagosei
 (a2-2): OXT-101=3-ethyl-3-hydroxymethyl oxetane; available by Toagosei (A4) Polyols
 (a4-1): Eternacoll UM90=aliphatic polycarbonate diol, available by UBE Industries Ltd.

Component (B): Photoinitiators for Cationic Polymerization (B1) Metallocenium-Based Photoinitiator
 (b1-1): R-gen 262=($\eta^5$-2,4-cyclopentadiene-1-yl)[(1,2,3,4,5,6-q)-(1-methylethyl)benzene]-iron (I)-hexafluoroantimonate; 50% in propylene carbonate; available by Chitec.

(B2) Onium-Based Photoinitiator
 (b2-1): Chivacure 1176=diphenyl(4-phenylthio)phenylsulfonium hexafluoroantimonates and (thiodi-4,1-phenylene)bis(diphenylsulfonium) dihexafluoroantimonates, 50% in propylene carbonate; available by Chitec.
 (b2-2): Bluesil 2074=(tolylcumyl) iodonium tetrakis (pentafluorophenyl) borate, available by Bluestar.
 (b2-3): UVI-6976=mixture of PhS—$(C_6H_4)$—S$^-$Ph$_2$SbF$_6^-$ and Ph$_2$S$^+$—$(C_6H_4)$S$(C_6H_4)$—S$^-$Ph$_2$ $(SbF_6^-)_2$, 50% in propylene carbonate; available by Dow Chemicals.
 (b2-4): Esacure 1064=mixture of PhS—$(C_6H_4)$—S$^+$-Ph$_2$PF$_6^-$ and Ph$_2$S$^+$—$(C_6H_4)$—S—$(C_6H_4)$—S$^+$Ph$_2$ $(PF_6^-)_2$, 50% in propylene carbonate; available by Lamberti.

Component (C): Additives (C1) Sensitizer:
 (c1-1): Speedcure 2-ITX=2-isopropyl thioxanthone, available by Lambson Ltd.

EMBODIMENTS

To perform the method according to the present invention, first the curable cationic compositions described in the following examples were formulated with the proportions of components (A) to (E) as shown in the table below.

To evaluate the properties, 50 mg of each composition from the examples was used.

In the following examples, $\lambda_1$ corresponds to 460 nm and $\lambda_2$ to 365 nm.

If not stated otherwise, irradiation was performed at the different wavelengths with an intensity of 200 mW/cm$^2$ for 30 s.

Final curing of the compositions was evaluated after 7-day storage at room temperature.

Recording of UV/VIS Spectra for Photoinitiator Selection

Suitability of the blend of photoinitiators for use in the method according to the present invention was determined by measuring the UV/VIS transmission of the blend in propylene carbonate (50 wt-%) as a solvent before and after irradiation of the blend of photoinitiators at the wavelength $\lambda_1$ of 460 nm. The compounds b1-1 and b2-1 mentioned above were used as photoinitiators. The amount-of-substance ratio of compounds b2-1 [mmol] and b1-1 [mmol] was 1.5:0.5 in the first blend, as stated in Example 1 below, and 0.5:0.5 in the second blend, as stated in Example 7 below.

Figure 2:
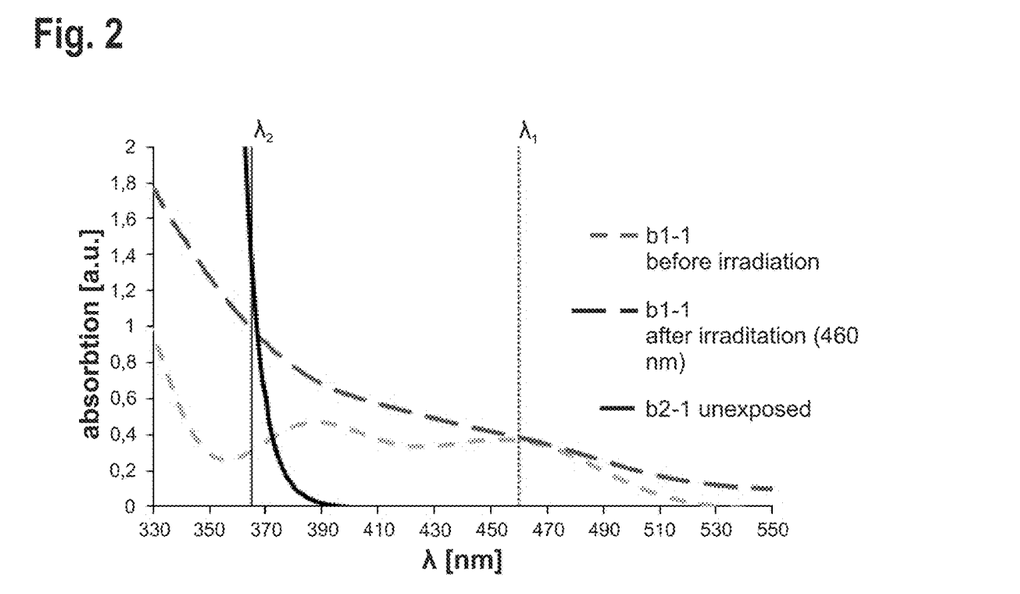
FIG. 2 shows UV/VIS spectra of a photoinitiator blend according to Example 1 before and after activation of the first photoinitiator by irradiation of the blend at a first wavelength $\lambda_1$.
Figure 3:
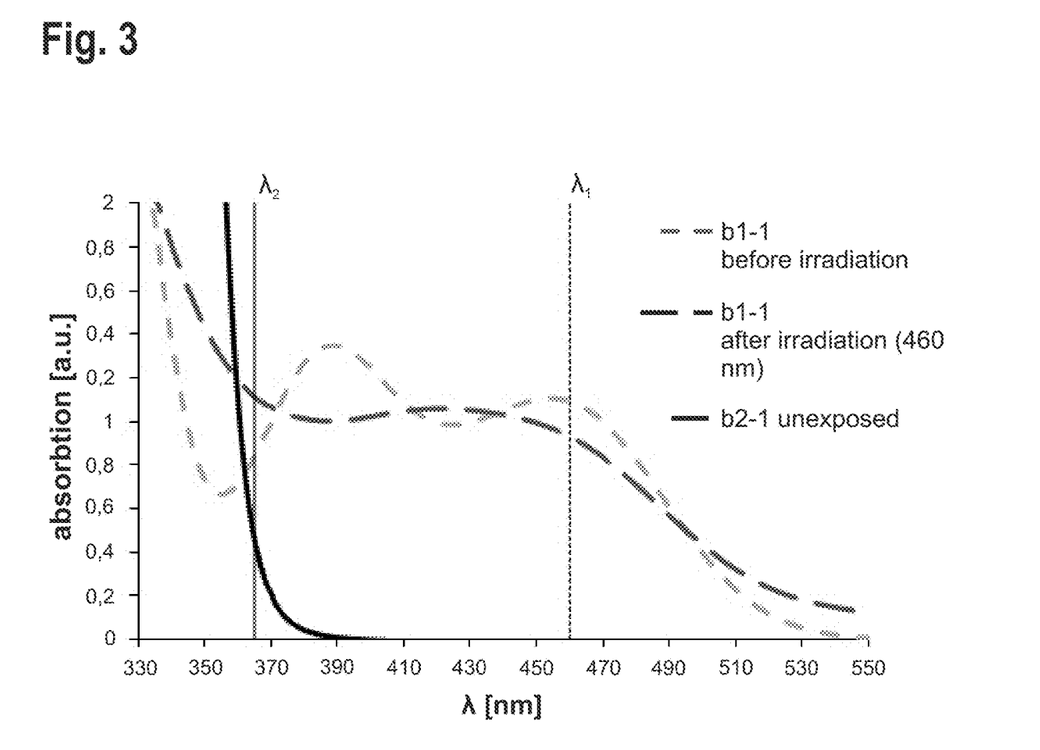
FIG. 3 shows UV/VIS spectra of a photoinitiator blend according to Example 7 before and after activation of the first photoinitiator by irradiation of the blend at a first wavelength $\lambda_1$.

The UV/VIS spectra thus obtained are presented in FIGS. 2 and 3.

The spectra in FIG. 2 show that the photoinitiator blend of Example 1 can be unrestrictedly used in the method according to the present invention. Even after irradiation of the blend at the wavelength $\lambda_1$, fixing of the composition by activation of the photoinitiator (B2) with actinic radiation of the wavelength $\lambda_2$ (365 nm) is unrestrictedly possible.

In contrast, the photoinitiator blend of Example 7 is not suitable to formulate a cationically curable composition suited for use in the method according to the present invention. Although, for example, the composition of Example 7 can be activated by irradiation with actinic radiation of the wavelength $\lambda_1$ (460 nm), the absorption behavior of the blend is changed due to the decomposition of the photoinitiator (B1) after the activation such that an activation of the second photoinitiator (B2) by irradiation at $\lambda_2$ (365 nm) is no longer possible. Thus, the composition remains in the liquid state directly after irradiation with $\lambda_2$.

| | Component | | | | | | | | |
|---|---|---|---|---|---|---|---|---|---|
| | Examples for performing the method according to the present invention | | | | | Comparative examples wt-% | | | |
| Example number | 1 | 2 | 3 | 4 | 5 | 6 | 7 | 8 | 9[1)] |
| Component (A): Cationically polymerizable constituents [wt-%] | | | | | | | | | |
| (a1-1) | 48.57 | 87 | 87 | 86.95 | 87.9 | 48.2 | 48.86 | 50 | 51.4 |
| (a2-1) | | 10.96 | 8.53 | 10 | 10 | | | | |
| (a2-2) | | | | | | | | | 45.9 |
| (a4-1) | 48.5 | | | | | 48.5 | 48.9 | 48.7 | |
| Component (B): Photoinitiators for cationic polymerization [wt-%] | | | | | | | | | |
| (b1-1) 50 wt-% in propylene carbonate | 0.48 | 1.43 | 2.85 | 1.43 | 0.48 | 0 | 1.43 | 0.48 | |
| (b2-1) 50 wt-% in propylene carbonate | 2.45 | | | | | 3.3 | 0.81 | 0.82 | |
| Amount-of-substance ratio (b2-1) [mmol]/ (b1-1) [mmol] | 1.5:0-5 | | | | | 2:0 | 0.5:1.5 | 0.5:0.5 | |
| (b2-2) | | 0.51 | 1.52 | 1.52 | 1.52 | | | | |
| Amount-of-substance ratio (b2-2) [mmol]/ (b1-1) [mmol] | | 0.5:1.5 | 1.5:3 | 1.5:1.5 | 1.5:0.5 | | | | |
| (b2-3) 50 wt-% in propylene carbonate | | | | | | | | | 2 |
| (b2-4) 50 wt-% in propylene carbonate | | | | | | | | | 0.7 |
| Amount-of-substance ratio (b2-4) [mmol]/ (b2-3) [mmol] | | | | | | | | | 0.51:1.22 |
| Component (C): Additives [wt-%] | | | | | | | | | |
| (c1-1) | 0.1 | 0.1 | 0.1 | 0.1 | | | | | |
| Properties of the compositions | | | | | | | | | |
| State after 30 s irradiation at $\lambda_2$ = 365 nm | solid | solid | solid | solid | solid | solid | solid | solid | solid |
| State after 30 s irradiation at $\lambda_1$ = 460 nm | liquid | liquid | liquid | liquid | liquid | liquid | liquid | liquid | liquid |
| State after sequential exposure of 30 s each at $\lambda_1$ = 460 nm and $\lambda_2$ = 365 nm | solid | solid | solid | solid | solid | solid | liquid | solid | solid |
| Exposure at $\lambda_1$ = 460 nm State after 7 d | solid | solid | solid | solid | solid | liquid | solid | solid | liquid |
| "UV spectra-selection criterion met" | yes | yes | yes | yes | yes | no | no | no | no |

[1)]Comparative example 9 following U.S. Pat. No. 7,964,248 B2

The compositions of Examples 1 to 5 allow for performing the method according to the present invention. The compositions described can each be activated by irradiation with actinic radiation of the wavelength $\lambda_1$ (460 nm) and initially remain in the liquid state. Within 7 days the compositions activated by irradiation at $\lambda_1$ reliably cure at room temperature, without additional heat input.

The compositions of Examples 1 to 5 are characterized in that, after activation at $\lambda_1$, they can be transferred in a dimensionally stable state by irradiation with actinic radiation of the wavelength $\lambda_2$ (365 nm) while forming a skin. For example, the compositions can be activated, after dosing onto the first substrate, by irradiation with light of the wavelength $\lambda_1$. Within this open time a second substrate can be supplied to the activated composition and optionally aligned in relation to the first substrate. Subsequent irradiation at the wavelength $\lambda_2$ allows for fixing the composition and thus also for fixing both substrates to one another. Final curing takes place at room temperature over a period of up to 7 days but can be optionally accelerated by heating. In contrast, exclusive exposure at $\lambda_2$ (365 nm) for 30 s causes direct skin formation in the composition making joining of a second substrate impossible.

The compositions of Examples 6 to 9 are comparative examples not suitable for the use in the method according to the present invention. The composition from comparative example 6 does not use a photoinitiator (B1) that can be activated at $\lambda_1$. Although irradiation with $\lambda_2$ causes the composition to cure, the cationically curable composition cannot be pre-activated according to step c) of the method according to the present invention.

The composition of comparative example 7 can be activated with $\lambda_1$. However, irradiation with $\lambda_1$ results in a decomposition of the first photoinitiator (B1) in such a way that the absorption of the second photoinitiator (B2) at the wavelength $\lambda_2$ is no longer sufficient to be activated in step e) of the described method. In contrast, the comparative composition of Example 1 having a higher proportion of amount-of-substance of the second photoinitiator (B2) as compared to the first photoinitiator (B1) and thus showing a different absorption behavior is unrestrictedly suitable for use in the method according to the present invention.

The composition of comparative example 8 has equimolar proportions of the two photoinitiators (B1) and (B2). Just as in Example 7, no sequential irradiation in the sense of the method according to the present invention can be performed with this composition. Although irradiation with $\lambda_1$ or $\lambda_2$ leads to curing of the composition, the changed absorption of the first photoinitiator (B1) after activation in step c) of the method according to the present invention does not allow for an unrestricted activation of the second photoinitiator (B2).

The composition of comparative example 9 corresponds to the formulation of Example 8 from U.S. Pat. No. 7,964,248 B2 and is not suitable for performing the method according to the present invention. Two different photoinitiators based on sulfonium salts with different counter anions are used. When performing sequential irradiation following the method according to the present invention, the composition is not activated when irradiated with the wavelength $\lambda_1$. Although irradiation with $\lambda_2$ causes the composition to cure, there is no complete curing in the non-translucent areas during joining processes as the photoinitiator (B1) is not activated.

The invention claimed is:

1. A cationically curable composition, comprising:
   a) at least one cationically polymerizable component;
   b) a first photoinitiator that releases an acid when the cationically curable composition is irradiated with actinic radiation of a first wavelength $\lambda_1$;
   c) a second photoinitiator that releases an acid when the cationically curable composition is irradiated with actinic radiation of a second wavelength $\lambda_2$, wherein the second photoinitiator comprises an aryl sulfonium salt,
   wherein the cationically curable composition has a higher proportion of amount-of-substance of the second photoinitiator as compared to the first photoinitiator, and
   wherein the second wavelength $\lambda_2$ is shorter than the first wavelength $\lambda_1$, wherein the first and the second photoinitiators are selected such that the first photoinitiator can be activated at a first wavelength $\lambda_1$ of 460 nm without the second photoinitiator being activated simultaneously, and wherein, after the activation of the first photoinitiator, an absorption band of the second photoinitiator at a wavelength $\lambda_2$ of 365 nm is above the absorption of the first photoinitiator and the decomposition products formed after the activation so that, after irradiation of the composition with actinic radiation of the first wavelength $\lambda_1$, the second photoinitiator shows an absorption of actinic radiation of the second wavelength $\lambda_2$ in the composition that is sufficient to activate the second photoinitiator and to fix the composition, wherein skin formation takes place in the composition.

2. The composition according to claim 1, wherein the cationically polymerizable component comprises a compound that is selected from the group consisting of epoxy-containing compounds, oxetane-containing compounds and vinyl ethers as well as combinations thereof, optionally together with a polyol as a reactive flexibilizer.

3. The composition according to claim 1, wherein the first photoinitiator is a metallocenium compound.

4. The composition according to claim 1, wherein the composition further comprises a peroxide as an accelerator for curing of the composition.

5. The composition according to claim 1, wherein the composition further comprises one or more radically polymerizable compounds based on (meth)acrylates in a proportion of up to 50 wt-%, based on the total weight of the composition, and a radical photoinitiator, and wherein the radical photoinitiator can be activated by irradiation with actinic radiation at the wavelength $\lambda_2$, but not at the wavelength $\lambda_1$.

6. The composition according to claim 1, wherein the composition consists of the following components, each based on the total weight of the composition:
   a) at least one cationically polymerizable component (A) in a proportion of 5 to 99.98 wt-%;
   the first photoinitiator (B1) in a proportion of 0.01 to 5 wt-%;
   the second photoinitiator (B2) in a proportion of 0.01 to 5 wt-%;
   a sensitizer (C1) for the second photoinitiator (B2) in a proportion of 0 to 5 wt-%;
   a peroxide as an accelerator (C2) for curing of the composition in a proportion of 0 to 5 wt-%;
   at least one radically polymerizable compound (D) in a proportion of 0 to 50 wt-%;
   a radical photoinitiator (E) in a proportion of 0 to 5 wt-%; and
   further additives (C) in a proportion of 0 to 70 wt-%.

7. A method for the joining, casting, molding, sealing and coating of substrates using a cationically curable composition, the method comprising:

a) providing a cationically curable composition at least one cationically polymerizable component, a first photoinitiator for cationic polymerization, and a second photoinitiator for cationic polymerization, wherein the second photoinitiator comprises an aryl sulfonium salt;
b) dosing the composition onto a first substrate;
c) activating the composition by irradiation with actinic radiation of a first wavelength $\lambda_1$, wherein an open time of the composition, during which the composition remains liquid, is started by activating the composition;
d) optionally supplying a second substrate to the activated composition on the first substrate, thus forming a substrate composite, and, furthermore, optionally aligning both substrates with one another;
e) fixing the activated composition by irradiation with actinic radiation of a second wavelength $\lambda_2$, wherein skin formation takes places and the open time of the composition ends; and
f) optionally heating the fixed composition on the first substrate or in the substrate composite,
wherein the cationically curable composition has a higher proportion of amount-of-substance of the second photoinitiator as compared to the first photoinitiator, and
wherein the cationically curable composition comprises the at least one cationically polymerizable component and the first photoinitiator releasing an acid when irradiated with actinic radiation of a first wavelength $\lambda_1$, as well as the second photoinitiator releasing an acid when irradiated with actinic radiation of a second wavelength $\lambda_2$, wherein the second wavelength $\lambda_2$ is shorter than the first wavelength $\lambda_1$, wherein the first and the second photoinitiators are selected such that the first photoinitiator can be activated at a first wavelength $\lambda_1$ of 460 nm without the second photoinitiator being activated simultaneously,
wherein, after activation of the first photoinitiator, an absorption band of the second photoinitiator at a wavelength $\lambda_2$ of 365 nm is above the absorption of the first photoinitiator and the decomposition products formed after the activation so that the second photoinitiator, after activation of the composition in step c), shows an absorption of actinic radiation of the second wavelength $\lambda_2$ in the composition that is sufficient to activate the second photoinitiator in step e).

8. The method according to claim 7, wherein the composition is activated in step c) with actinic radiation of a wavelength $\lambda_1$ ranging from 400 to 600 nm.

9. The method according to claim 7, wherein the composition in step e) is fixed by irradiation with actinic radiation of a wavelength $\lambda_2$ ranging from 200 to 400 nm.

10. The method according to claim 7, wherein the first and/or the second substrate is an optoelectronic component.

11. The cationically curable composition according to claim 1 adapted for use for joining, casting, molding, sealing and/or coating of substrates, wherein the composition is capable of being activated by irradiation with actinic radiation of a first wavelength $\lambda_1$ ranging from 400 to 600 nm and fixed by subsequent irradiation with actinic radiation of a second wavelength $\lambda_2$ ranging from 200 to 400 nm, with the second wavelength $\lambda_2$ being shorter than the first wavelength $\lambda_1$.

12. The cationically curable composition according to claim 1, wherein the first photoinitiator is a ferrocenium salt.

13. The cationically curable composition according to claim 6, wherein:
the cationically polymerizable component (A) is selected from the group consisting of epoxy-containing compounds (A1), oxetane-containing compounds (A2), vinyl ethers (A3) and combinations thereof, optionally together with an alcohol as a reactive flexibilizer (A4) in a proportion of 0 to 80 wt-%;
the first photoinitiator (B1) is a ferrocenium salt;
the second photoinitiator (B2) is an aryl sulfonium salt, an aryl iodonium salt, or a combinations thereof;
the at least one radically polymerizable compound (D) is based on a (meth)acrylate; and
the further additives (C) are further additives from the group of fillers, colorants, pigments, anti-ageing agents, fluorescent agents, stabilizers, accelerators, adhesion promoters, drying agents, crosslinking agents, flow improvers, wetting agents, thixotropic agents, diluents, non-reactive flexibilizers, non-reactive polymeric thickeners, flame retardants, corrosion inhibitors, plasticizers and tackifiers.

14. The cationically curable composition according to claim 6, wherein the composition comprises 5 to 50 wt. % of the at least one radically polymerizable compound (D), and 0.1 to 5 wt-% of the radical photoinitiator (E), each based on the total weight of the composition.

15. The method according to claim 8, wherein the composition is activated in step c) with actinic radiation of a wavelength $\lambda_1$ at 460±20 nm.

16. The method according to claim 8, wherein the composition is activated in step c) with actinic radiation of the wavelength $\lambda_1$ by using a radiation source with a singular emission peak.

17. The method according to claim 9, wherein the composition in step e) is fixed by irradiation with actinic radiation of a wavelength $\lambda_2$ at 365±20 nm.

18. The method according to claim 9, wherein the composition in step e) is fixed by irradiation with actinic radiation at the wavelength $\lambda_2$ by using a radiation source with a singular emission peak.

19. The method according to claim 10, wherein the optoelectronic component is a camera module.

20. The composition according to claim 1, wherein the ratio of the amount of substance of the second photoinitiator to the amount of substance of the first photoinitiator is 3:1 or more.

21. The composition according to claim 1, wherein the second photoinitiator is an aryl sulfonium salt.

22. The composition according to claim 1, wherein the composition comprises a sensitizer (C1) for the second photoinitiator selected from the group consisting of anthracene, perylene, phenothiazine, xanthone, thioxanthone, benzophenone, ethyl-4-dimethylaminobenzoate, sterically hindered amines and combinations thereof.

23. The composition according to claim 1, wherein the composition consists of the following components: the at least one cationically polymerizable component (A); the first photoinitiator (B1); the second photoinitiator (B2); and optionally a sensitizer (C1) for the second photoinitiator, a peroxide as an accelerator (C2) for curing the composition and/or further additives (C).

24. The composition of claim 23, wherein the second photoinitiator is an aryl sulfonium salt.

25. The composition of claim 23, the sensitizer (C1) for the second photoinitiator selected from the group consisting of anthracene, perylene, phenothiazine, xanthone, thioxanthone, benzophenone, ethyl-4-dimethylaminobenzoate, sterically hindered amines and combinations thereof.

26. The composition of claim 1, wherein the composition is dosed onto a substrate and activated via irradiation with the actinic radiation of the first wavelength $\lambda 1$, wherein an open time of the composition, during which the composition remains in liquid state, is started by activating the composition, and wherein the composition is fixed via irradiation with the actinic radiation of the second wavelength λ2, wherein skin formation takes places and the open time of the composition ends.

27. The method of claim 7, wherein the second photoinitiator is an aryl sulfonium salt.

28. The method of claim 7, wherein the composition consists of the following components: the at least one cationically polymerizable component (A); the first photoinitiator (B1); the second photoinitiator (B2); and optionally a sensitizer (C1) for the second photoinitiator, a peroxide as an accelerator (C2) for curing the composition and/or further additives (C).

* * * * *